REMOTE MONITORING AMPLIFICATION

Filed Feb. 16, 1955 2 Sheets-Sheet 1

INVENTOR.
SAMUEL LUBIN
BY
Connolly and Hutz
HIS ATTORNEYS

Aug. 25, 1959 S. LUBIN 2,901,634

REMOTE MONITORING AMPLIFICATION

Filed Feb. 16, 1955 2 Sheets-Sheet 2

INVENTOR.
SAMUEL LUBIN
BY
Connolly and Hutz
HIS ATTORNEYS

United States Patent Office 2,901,634

Patented Aug. 25, 1959

2,901,634

REMOTE MONITORING AMPLIFICATION

Samuel Lubin, Pittsfield, Mass., assignor to Sprague Electric Company, North Adams, Mass., a corporation of Massachusetts Application February 16, 1955, Serial No. 488,634

2 Claims. (Cl. 340—253)

This invention relates to amplification arrangements, more particularly to such arrangements that are suitable for use in remote monitoring systems.

In prior Patent No. 2,574,458, granted November 13, 1951, there is described a monitoring system by which outages on a power transmission line, many miles in length, can be readily located by a locally positioned monitoring unit. As explained in that patent, such a unit includes a local carrier wave generator connected to locally deliver the carrier waves to the transmission line, and a plurality of remotely located modulators connected to spaced locations on the line, each having a different modulating frequency. The monitoring unit detects and indicates the presence of the remotely applied modulation and thereby shows by the absence of any or all of these modulation signals, where the line outage is located.

Among the objects of the present invention is the provision of an amplification arrangement that is highly effective for use with the above monitoring system.

The above as well as additional objects of the present invention will be more clearly understood from the following description of several of its exemplifications, reference being made to the accompanying drawings wherein.

It has been found that much more effective amplification of the signals to be monitored can be obtained when the amplifier has an input circuit including a sharply tuned carrier rejection filter connected to reduce the carrier level in the incoming signals without at the same time reducing the side-band energy and thereby effectively increase the degree of modulation at the receiver input, a high frequency amplification circuit connected to amplify the incoming signals of reduced carrier level by at least about 30 decibels, and a detector and demodulated signal amplification circuit connected to separate the modulation signal from the carrier and further amplify the modulating signal by at least about 30 decibels. In fact, with this arrangement the range of the above type of monitoring system can be extended to 100 miles or more on low voltage distribution lines, a distance which is hopelessly out of reach when other types of amplification arrangements are used.

Figure 1:
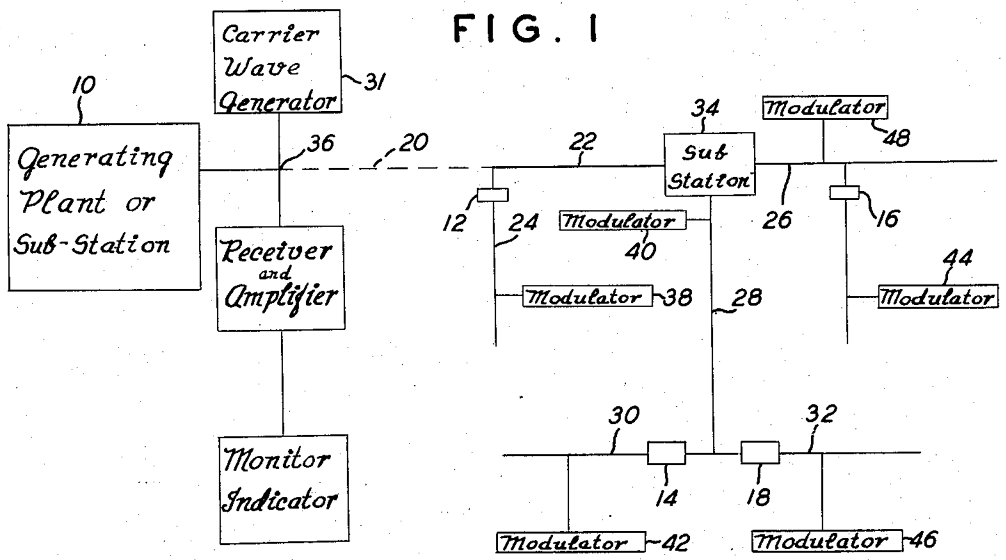
Fig. 1 is a schematic representation of a remote monitoring system incorporating the present invention.

Referring specifically to Fig. 1, there is here shown an electric power transmission system in which a generating plant 10, or other power source, is connected to a power transmission and distribution system consisting of conductors indicated at 20, 22, 24, 26, 28, 30 and 32. A substation is shown at 34 for transforming the voltage supplied by conductor 20 to a value more suitable for further transmission or distribution. Line clearing devices such as conventional rapidly acting circuit breakers may also be connected in the line, as shown at 12, 14, 16 and 18 to open the line circuit in the event of a short in the portion of the line on the load side of a breaker.

The remote monitoring system of the invention is applied to the transmission line system of Fig. 1, by connecting to the line at some convenient monitoring location, as at 36, a combination high frequency carrier supply and monitor. At points where it is desired to monitor the presence or absence of line voltage on the conductor, there are also connected to the line individual modulators represented at 38, 40, 42, 44, 46, and 48.

As described in the above-identified patent, the monitoring system functions by causing the line to carry the high frequency carrier waves applied by a source such as generator 31 and causing the modulators to each impress a different low frequency rate of amplitude modulation on the carrier waves. At the monitoring location 36 the presence of each of these individual modulation frequencies is detected and separately indicated. In the event of a line outage, such as an open circuit due to the breaker, the modulations of modulators in the deenergized portions of the line will no longer be received at the monitor. Thus, if the monitor suddenly shows the absence of the modulation of modulator 42, for example, while indicating the presence of the other modulations, it would be clear that an outage exists on section 30. If desired, additional modulators can be used to reduce the length of individual line sections being monitored.

As indicated in Fig. 1, a line conductor may be used as the monitor line, the carrier being impressed between this line conductor and ground or earth. In such case the ground functions as a second line conductor. If desired, however, the carrier can be impressed between a pair of line conductors that are not grounded. This pair of conductors may constitute a complete single phase transmission line, or may be part of a multiconductor or multiphase line.

The carrier and modulating frequencies are selected so as not to unduly interfere with the normal functions of the line or with established communication frequency channels. It has been found that a carrier frequency of about 30,000 to about 150,000 cycles per second, and modulation frequencies of from about 200 to about 10,000 or more cycles per second are highly satisfactory with power lines carrying the standard 60 cycle-per-second electric power.

Figure 2:
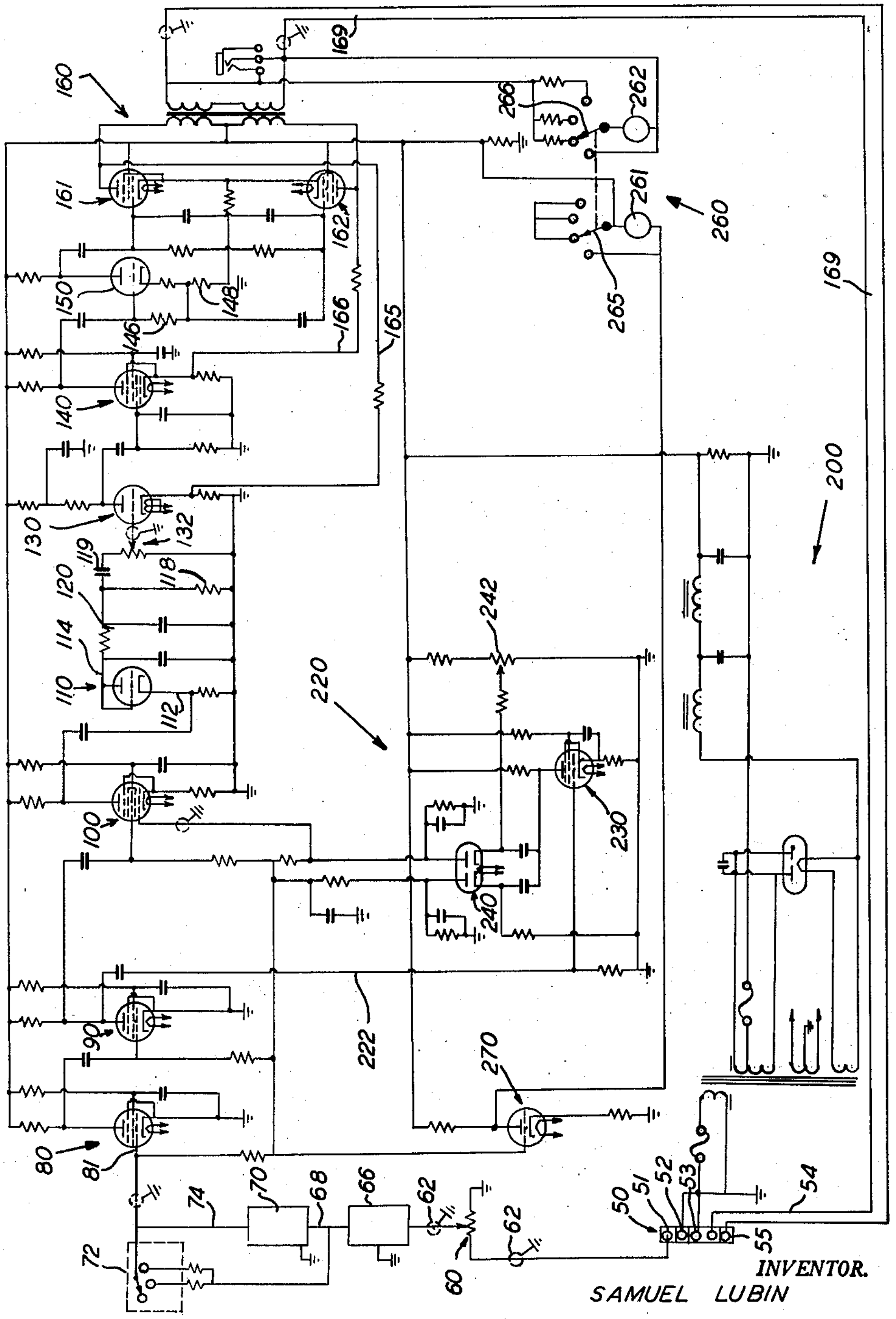
Fig. 2 is a detailed circuit diagram of an amplification arrangement forming part of the monitoring system according to the present invention.

Fig. 2 represents an amplification arrangement according to the present invention. A terminal block 50 includes an input terminal 51 and a ground terminal 52 between which incoming signals are impressed. Connected between them is a potentiometer 60 preferably in a shielded connection as indicated at 62, to supply an adjustable portion of the incoming signal intensity for amplification. This is helpful in using the amplifier under different operating conditions where the incoming signals are of widely varying intensity. From the potentiometer the signals are transmitted through a band pass filter 66, which can be of the usual inductance-capacitance type, connected to exclude those frequencies which are not contained in the modulation channel within which the particular monitoring system operates. Lead 68 then takes the band pass output and delivers it to carrier-rejection filter 70 from which it is impressed by lead 74 to the input grid 81 of an amplification stage 80. This stage is resistance-capacitance coupled to another stage 90, and a third stage 100 is also resistance-capacitance coupled in cascade. From 100 the amplified signals are shown as delivered to the cathode 112 of a diode-connected stage 110, where the incoming signals are demodulated. From the anode 114 of this stage the signals are carried through a low-pass filter 120 shown as a resistance-capacitance pi circuit and impressed across load resistor 118. Blocking capacitor 119 applies the demodulated low frequency signals to amplification stage 130 by way of an adjustable potentiometer 132. From stage 130 the amplified signals are then passed through a cascaded stage 140 and impressed across two series connected resistors 146, 148. As shown the signals are given a final amplification by means of a push-pull circuit 160 having individual stages 161, 162 suitably connected together in push-pull relationship. An intervening phase inverter stage 150 reverses the phase of the portion of the signals appearing across the resistor 146 and delivers the inverted signals to push-pull stage 161. The push-pull stage 162 receives its signals directly from resistor 148. The final amplified signals are then supplied by a pair of leads 169 to two additional terminals 54, 55 on terminal block 50. Power for energizing the various stages is shown as supplied by a circuit 200, which can be of any desired type, connected to terminal 53 of the terminal block, and containing sufficient filters to insure proper operation.

The carrier-rejection filter 70 should be sharply tuned, as by employing a piezoelectric crystal circuit, a number of bridged-T circuits in cascade, a mechanical carrier filter, directional coupler, or similar device so as to provide at least about 60 decibels of carrier attenuation without seriously removing any of the modulation side bands.

At the relatively low carrier frequencies given above, stray capacitance affects are of no appreciable significance and all that is needed for effective carrier attenuation is to directly shunt the signal carrying line by a piezoelectric quartz crystal ground so as to resonate at the carrier frequency. For best results the resonance of the crystal should closely follow any changes in the carrier frequencies as by using an identical crystal to control the oscillator of the carrier current generator and mounting both crystals side by side so that any temperature change affects them both in identical fashions. If desired, the inherent capacitance of the attenuation crystal, as well as its holder, can be balanced out by connecting a small, preferably adjustable, capacitor in series in the signal transmitting circuit.

Other suitable forms of piezoelectric carrier attenuation or rejection circuits that can be used as part of the present invention, include those described in U.S. Patent 1,808,524, granted June 2, 1931, U.S. Patent 2,212,840, granted August 27, 1940, U.S. Patent 2,240,142, granted April 29, 1941, U.S. Patent 2,459,019, granted January 11, 1949 and that described in connection with Fig. 1 of U.S. Patent 2,510,868, granted June 6, 1950.

Figure 3:
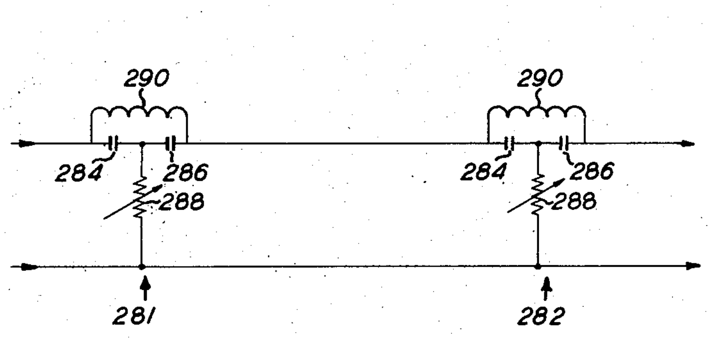
Fig. 3 shows one type of filter assembly that can be used in the arrangement of Fig. 2.

Fig. 3 illustrates a carrier rejection filter consisting of two stages of bridged-T rejection circuits. The stages are shown at 281, 282 as identical, each having a pair of series-connected capacitors 284, 286 inserted in a signal-carrying conductor, and a variable resistor 288 shunted across the signal conductors in each stage between its capacitors. In parallel with both capacitors of each stage is connected an inductor 290. The values of inductance and capacitance are such as to form a parallel-tuned circuit at the carrier rejection frequency. The variable resistor R is adjusted for minimum transmission (maximum rejection) of the carrier frequency through the filter. The value of R is dependent on the effective Q of the inductance, the frequency, and the input and output impedances of the filter. With two stages in cascade the carrier frequency can be attenuated from 40 to 60 decibels with side-bands above 300 cycles practically unattenuated. By use of the piezoelectric crystal filter side bands as low as 120 cycles can be passed with attenuations of less than 3 decibels.

In some cases the carrier attenuation may reduce the carrier level so sharply as to cause some of the modulating signal to become over modulated. To avoid this, a carrier-rejection attenuator 72, shown as connected in parallel across the rejection filter 70, is arranged to by-pass controllable small portions of the incoming signals around the rejection filter, if desired.

The amplifier arrangement of Fig. 2 includes a noise limiting circuit 220 which receives, by means of lead 222, some of the signals amplified by stage 90, separately amplifies them in stage 230, and returns these amplified signals through the right half of dual diode 240. Through this half of the diodes the noise signal is returned to a second input electrode of stage 100. Stage 100 is operated as a mixer to cause these returned signals, which have been inverted in phase by the amplification in stage 230, to reduce the intensity of corresponding noise signals appearing in the other input electrode of stage 100. The signals thus returning to the second input electrode stage 100 are controlled by a bias adjustment 242 which supplies an adjustable amount of D.C. bias to the diode in the return circuit. This bias is adjusted to equal the level of carrier plus signal modulation at the cathode of the diode so that only noise pulses in excess of this value will pass through the diode. The left half of the diode is part of a standard AVC circuit used to maintain a steady audio output when changes occur in the carrier input to the receiver.

Fig. 2 also shows an indicating circuit 260 including meters 261, 262 selectably connected by switches 265, 266 to measure the intensity of the modulated carrier signals as they appear on input electrode 81, and the amplified modulation output respectively. To operate the meter 261 from the low intensity signals that are supplied, a separate amplifier stage 270 is shown as responding to the D.C. grid voltages that are developed in stages 81 and 90.

As also shown in Fig. 2, the amplifier can include feed-back arrangements to improve its operation. In the illustrated form, a line 165 supplies feed-back from the output of stage 161 through a high resistance to the cathode of stage 130. At the same time there is also shown a lead 166 in feed-back connection between the output of stage 162 and the cathode of stage 140.

A feature of the present invention is that it provides more uniform amplification over wide ranges of operating conditions. Thus, with some outage monitor systems, an overall amplification gain of 100 or more decibels is needed to obtain reliable indications. This degree of amplification cannot be realized from conventional amplifiers when used with the available signals as they are received in the monitor unit. These signals can have a modulation of only a small fraction of 1% so that even if they are amplified, detected, and further amplified, the accompanying noise is too intense. Even the best noise-limiting circuits available will not make such a noisy signal suitable for practical applications.

An additional feature of the present invention is the simplicity of amplification which it makes possible. Although some high frequency amplification is used in accordance with the present invention so that the signal level is brought up considerably before demodulation, the high frequency stages do not need the expensive and relatively delicate resonant circuits. Simple resistance-capacitance-coupled interstage connections are perfectly satisfactory, as shown in Fig. 2, particularly if the resistances and the capacitances are selected to provide some degree of attenuation for low frequency signals. In other words, the coupling capacitors between the stages can be selected to have a capacitance extremely low with respect to the load resistances to limit the transfer of undesired signals outside of the band pass to be amplified. Coupling capacitances of 10 micro-microfarads, for example, with load resistances of 470,000 ohms, are very suitable for this purpose although it is obvious that the proportion of capacitive impedance to resistance can be provided with other values, and the proportions can be varied with the particular band pass or the particular modulation channel.

The specific manner in which the demodulated output of the amplification is arranged to actuate the desired indicators forms no part of the present invention. Any suitable circuit for distinguishing the various individual modulation frequencies and operating an indicator can be used, as illustrated for example in the copending patent application of Atkinson et al., Serial No. 171,628, filed July 1, 1950.

Obviously many modifications and variations of the present invention are possible in the light of the above teachings. It is, therefore, to be understood that within the scope of the appended claims the invention may be practiced otherwise than as specifically described.

What is claimed is:

1. In an electric signal receiver connected to directly receive high frequency carrier signals from a carrier generator and to detect and amplify remotely generated audio frequency modulation on said carrier, an input circuit including a sharply-tuned carrier rejection piezo-electric filter connected to reduce the carrier level in the incoming signals and thereby effectively increase the degree of modulation, a high frequency amplification circuit connected to amplify the incoming signals of reduced carrier level by at least about 30 decibels, and a detector and demodulated signal amplification circuit connected to separate the modulation signal from the carrier and further amplify the modulating signal by at least about 30 decibels.

2. A remote monitoring system including a locally positioned carrier wave generator, elongated conductor means connected to the generator to convey the high frequency carrier waves to a remote location, modulating means connected to the conductor means at said remote location to modulate the carrier with audio frequency modulation, and a monitor locally connected to the conductor means to detect and indicate the presence of the remotely generated modulation, said monitor including an amplification network having an input circuit including a sharply-tuned carrier rejection filter connected to reduce the carrier level in the incoming signals and thereby effectively increase the degree of modulation, a high frequency amplification circuit connected to amplify the incoming signals of reduced carrier level by at least about 30 decibels, and a detector and demodulated signal amplification circuit connected to separate the modulating signal from the carrier and further amplify the modulating signal by at least about 30 decibels.

References Cited in the file of this patent

UNITED STATES PATENTS

| | | |
|---|---|---|
| 2,209,541 | Rust | July 30, 1940 |
| 2,281,508 | Lundstron | Apr. 28, 1942 |
| 2,337,441 | Atkinson et al. | Dec. 21, 1943 |
| 2,337,878 | Espenschied | Dec. 28, 1943 |
| 2,437,876 | Cohn | Mar. 16, 1948 |
| 2,556,669 | Albersheim | June 12, 1951 |
| 2,574,458 | Atkinson et al. | Nov. 13, 1951 |
| 2,604,544 | Dillon et al. | July 22, 1952 |
| 2,695,991 | Atkinson et al. | Nov. 30, 1954 |